July 7, 1959 J. WEISE ET AL 2,893,301
PHOTOGRAPHIC LENS SHUTTER WITH A BRAKING MECHANISM
FOR THE CONTROL OF THE EXPOSURE TIME
Filed Dec. 2, 1955 2 Sheets-Sheet 1

Inventors
J. WEISE, O. FISCHER,
W. HAHN, K. KRÖMER
& R. NOACK
By
Young, Emery & Thompson
Attorneys

United States Patent Office 2,893,301
Patented July 7, 1959

2,893,301

PHOTOGRAPHIC LENS SHUTTER WITH A BRAKING MECHANISM FOR THE CONTROL OF THE EXPOSURE TIME

Johannes Weise, Oskar Fischer, and Werner Hahn, Dresden, Karl Krömer, Radebeul, and Rolf Noack, Dresden, Germany, assignors to VEB Zeiss Ikon, Dresden, Germany, a corporation of Germany Application December 2, 1955, Serial No. 550,724
Claims priority, application Germany December 4, 1954
7 Claims. (Cl. 95—62)

The present invention relates to photographic lens shutters, and in particular to so-called automatic shutters, which are provided with a braking mechanism for the purpose of regulating the exposure time.

Various shutter constructions have already been disclosed which have built-in braking mechanisms for the purpose of regulating exposure times. These shutters have the disadvantage that they are complicated in construction and do not provide the required short exposure times partly because the sum of the masses to be moved is relatively large and partly because excessive frictional losses arise from the arrangement of drive rings disposed around the lens tube. The obtaining of very short exposure times is further rendered difficult by the fact that the impact cam, provided for the blade movement on the drive ring mounted round the lens tube, has a part in the form of an arc of a circle which, by constraint, produces an open period even at the shortest exposure time and thus prolongs the total exposure time.

The object of the present invention is to create an arrangement for controlling and driving the blades which enables exposures to be made with both long and very short exposure times. At the same time the shutter driving spring should not be of excessive strength, in order that the pressure-release moment may not be increased beyond the customary amount when this type of shutter is used as an automatic shutter.

According to the invention this is achieved by providing, in addition to the blade driving means abruptly moving the blade lever, a control element which is influenced by a braking mechanism and which interrupts the running-down movement of the blade driving means in a position corresponding to the open position of the blades and which after an interval of time regulated by the braking mechanism releases the blade driving means to continue its running-down movement for the purpose of conveying the blades into their closed position. A special feature of the invention is the separate arrangement of the spring or other power storing means for the blade driving means and the driving lever for the braking mechanism, which jointly drive the blades when the shutter is set to the shortest exposure time. A further feature is the construction of the control element as a control ring which, apart from its actual function, namely the interrupting of the blade movement in the open position, also disconnects the braking mechanism anchoring means in order to enable a weak return spring to return the braking mechanism to its position of readiness. A feature of the invention important for obtaining the shortest exposure time is the arrangement of a locking pawl, which prevents the control element from obstructing the running-down movement of the blade driving means. In this way the driving means can cause the closing movement immediately to follow the opening movement of the blades. According to a further feature the driving lever is mounted with the release lever which serves for tensioning and release on a common pivot.

Further details of the invention are clear from the illustrated exemplified embodiment of a shutter according to the invention, wherein.

Figure 1:
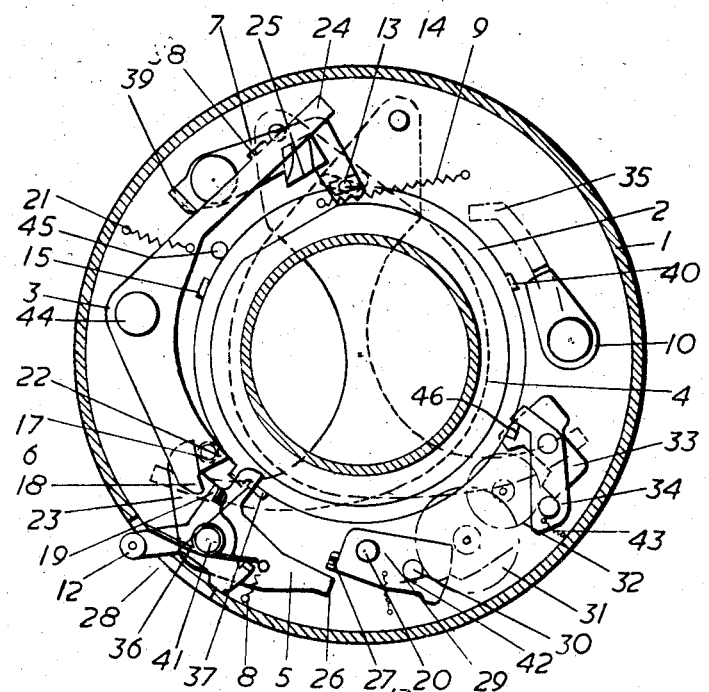
Figure 1 shows a shutter made in accordance with the invention in the position of rest.

A shutter release lever 12 is provided with a spring 36 and is mounted in the housing 1 so as to be rotatable about a pivot pin 41. The release lever cooperates through a bevelled projection 19 with the edge 18 of a blade driving means which is in the form of a striking lever 3. This striking lever is rotatably mounted at 44. An arm 24 of the striking lever 3 serves to transmit the movement to a blade lever 7, which projects with a pin 13 into slots 14 in the blades 4. A three-armed driving lever 5 is also mounted in the housing 1 so as to be rotatable about the pin 41. Said three-armed lever cooperates, by means of its three arms 23, 28 and 26, with a striking lever 3, the control element which is a ring 2, and a braking means 29. The latter is in engagement with the braking mechanism 31—33 and is controlled in known manner, for the purpose of obtaining different exposure times, by the cam 42 of a time setting means not illustrated. In addition, a locking pawl 10 is also provided. It is rocked by a curved member 35 of the time setting means into the path of the control ring 2 when the shortest exposure time is selected.

Figure 3:
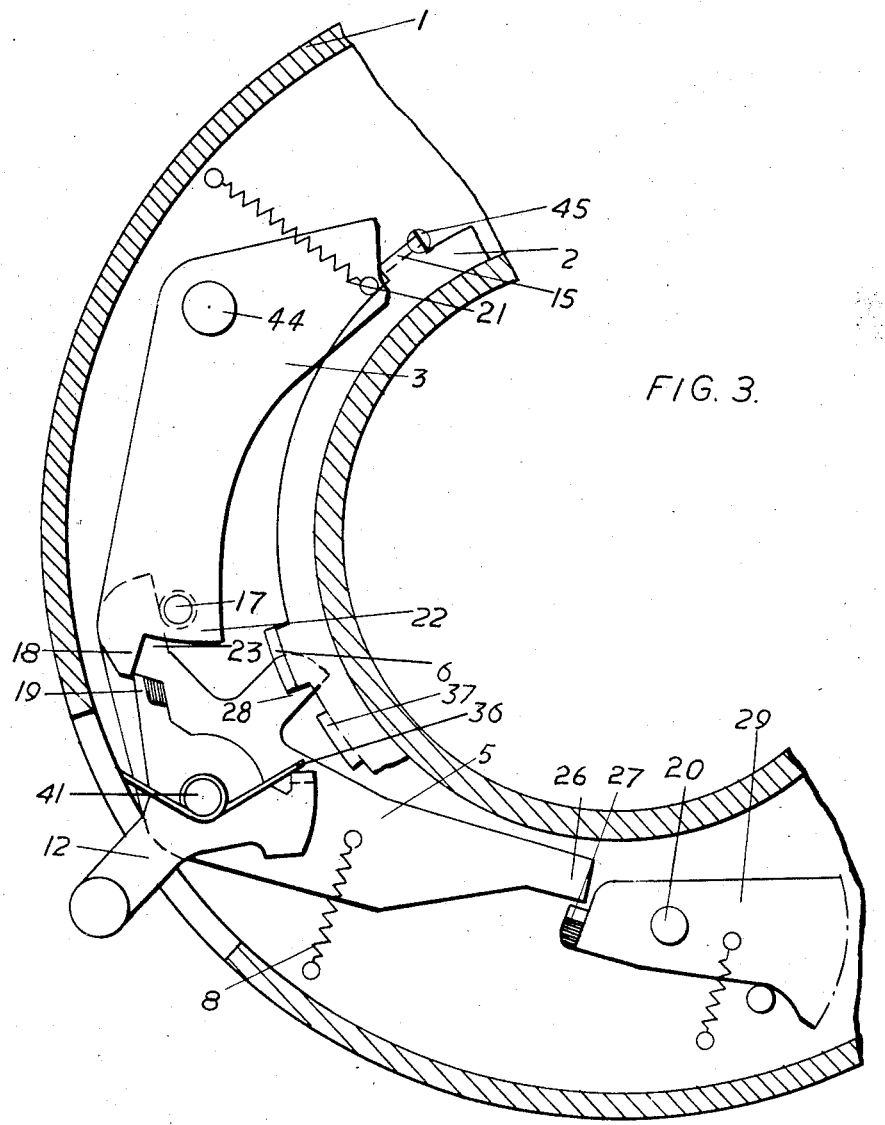
Figure 3 is an enlarged detail with the shutter tensioned.

When the release lever 12 is operated, it drives the striking lever 3 against the action of the spring 21, the bevelled projection 19 engaging the striking lever 3 at the edge 18 (Figure 1 and 3). During this movement of the striking lever 3 in the clockwise direction, the striking lever arm 24 slides inoperatively over the roof-edge 25 of the blade lever 7 on the one hand, and on the other hand engages by means of the pin 17 attached to the striking lever 3 the driving lever 5 on the arm 23 and turns it in the anti-clockwise direction, thus tensioning the driving spring 8. In consequence of the turning of the driving lever 5, the control ring 2, which was until then held by the driving lever arm 28 against the action of the follower spring 9, runs behind the said arm 28 until it strikes against the stop 45 with its projection 15. The locking projection 6 is at the same time moved into the path of the striking lever point 22. Furthermore, during the tensioning movement the driving lever 5 slides with its arm 26 over the bevel 27 of the braking means 29. The rocking lever 34 coupled to the control ring 2 and carrying the anchoring means 33 simultaneously moves into such a position by the action of the spring 43 that the anchoring means 33 is in engagement with the anchor wheel 32.

Figure 2:
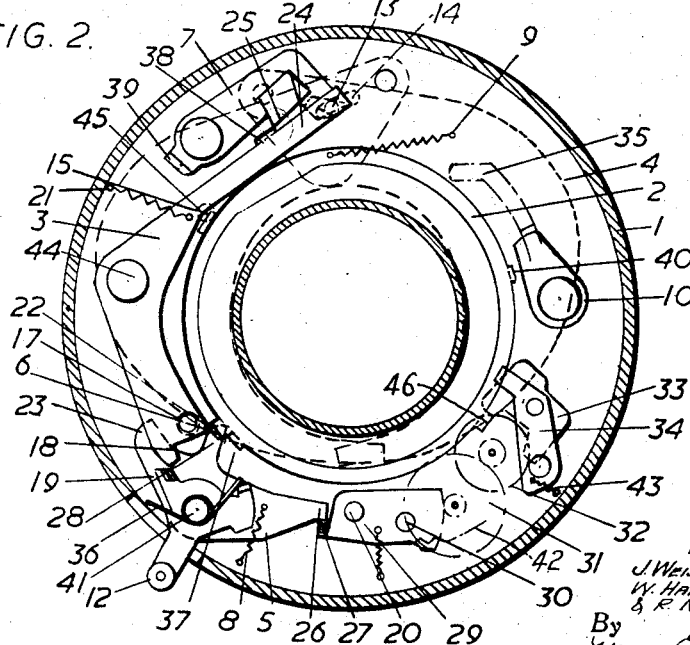
Figure 2 shows the shutter during the exposure process.

After the tensioning position has been reached, the projection 19 of the release lever 12 leaves the edge 18 and releases the striking lever 3 so that it can run down in the anticlockwise direction (Figure 2). During this movement the driving projection 38 of the striking lever 3 engages the blade lever 7 at the roof-edge 25 and turns said lever in the anticlockwise direction so that the blades 4 coupled with the blade lever 7 are moved into the open position. After the striking lever 3 has brought the blades into the open position, the point 22 encounters the locking projection 6 of the control ring 2 and must interrupt its movement. The running-down movement of the striking lever 3 also gives the driving lever 5 the possibility of running down under the action of the driving spring 8. During this movement the driving lever 5 is, however, delayed by the braking means 29 lying in the path of the arm 26. The striking lever 3 continues its running-down movement only after the driving lever 5, the movement of which is obstructed by the braking means 29 mounted at 20, has turned the control ring 2 against the action of the follower spring 9—the arm 28 pushing the heel 27 before it—and the locking projection 6 has moved out of the path of the point 22. The driving projection 38 then leaves the roof-edge 25 on the blade lever 7, whereupon the arm 24 abruptly strikes the end 39 of the blade lever 7, so that the direction of movement of the blade lever 7 is reversed and the shutter closed. The rocking lever 34 carrying the anchor 33 is brought into such a position, by the cam 46 when said lever returns—owing to the driving lever 5—into the position of readiness, that the anchor 33 is no longer in engagement with the anchor wheel 32.

If an exposure is to be made with a very short exposure time, the curved part 35 of the setting means for the exposure time causes the pawl 10 to assume a position in front of the lug 40 of the control ring 2. On operation of the release lever 12 it is thus not possible for the control ring 2 to place the locking projection 6 in the path of the point 22. The striking lever 3 is thus not stopped during its operative movement and causes the closing movement immediately to follow the opening movement of the blades 4. Moreover, the braking means 29 is brought into an inoperative position, that is to say the bevel 27 is situated outside the path of the driving lever arm 26, through the setting of the exposure time setting means by means of the cam 42 engaging the pin 30. This gives the advantage that the energy of the driving lever 5 can be also directly utilized for the blade drive, in such manner that the turning moments of the driving spring 8 and the striking lever spring 21 are added.

Irrespective of the form of construction the idea of the invention may assume in detail, whether as a so-called automatic or tension shutter, the essential feature is always that the means driving the blades is stopped in a position corresponding to the open position of the blades and is released only after a previously selected interval of time.

What we claim is:

1. A photographic lens shutter comprising in combination, an apertured housing, a plurality of shutter blades rotatably mounted within said housing capable of being rotated to open and close said aperture, an actuating lever for actuating said shutter blades, said actuating lever being also mounted within said housing and operatively connected with said blades, a striking lever arranged within the housing and engageable with the actuating lever for driving said actuating lever alternately in opposite directions for opening and closing the aperture, a first spring connected to the striking lever for continuously urging said striking lever towards one direction, a release lever which is engageable with said striking lever to drive the latter against the action of the first spring and which releases the striking lever to allow the latter to run down under the action of said first spring, a control element mounted in said housing and movable into the path of the striking lever to engage the latter to stop the running-down movement thereof, a second spring connected to the control element for moving the latter into the path of the striking lever, a driving lever mounted in said housing in driving connection with said control element for moving the latter out of the path of the striking lever, a third spring connected to the driving lever to urge it in a direction tending to move the control element out of the path of the striking lever, and a braking mechanism mounted in said housing and engageable with said driving lever to brake the movement thereof and consequently also to brake the movement of said control element, whereby on actuation of the release lever the striking lever is driven in one direction by said release lever and on continued actuation of said release lever the striking lever starts to run down under the action of the first spring, whereupon said striking lever is stopped by the control element in its running-down movement in a position which holds the actuating lever in such position as to hold the blades in the open positions, said striking lever remaining in this stopped position during an interval of time regulated by the braking mechanism, said driving lever under the influence of said third spring moving the control element to release the striking lever allowing it to continue its running-down movement so that it drives the actuating lever which moves the blades to close the shutter aperture.

2. A photographic lens shutter as claimed in claim 1, which includes in the housing a movable exposure time setting means having a stepped cam portion, a pivotally mounted braking lever which is part of the braking mechanism, and a fourth spring for rotating the braking lever in one direction, said braking lever being rotatably driven in the other direction by the driving lever during braking, said braking having means held in engagement against one of said steps by said fourth spring in order to locate the braking lever in its initial position prior to the commencement of the braking, which initial position is altered according to the step selected so that the length of the path of travel of the braking lever is predetermined and corresponds to the length of exposure time required.

3. A photographic lens shutter as claimed in claim 2, in which a further step is provided on the cam portion of the setting means which step is engageable by the means on said braking lever to hold the latter in a position so as to be out of the path of the driving lever and consequently out of driving engagement therewith, whereby the driving means is free to run down without braking by the braking mechanism.

4. A photographic lens shutter as claimed in claim 1, which includes a pin provided on the striking lever, which pin engages the driving lever when the striking lever is moved by the release lever, to drive it into a tensioned position prior to release.

5. A photographic lens shutter as claimed in claim 1, which includes a locking pawl pivotally mounted on said housing, and a locking projection provided on said control element, whereby the locking pawl is movable to engage the projection so that said second spring becomes inoperative by reason of the locking of the control element.

6. A photographic lens shutter as claimed in claim 1, in which a pivot is provided for pivotally mounting the release lever and the driving lever on a common axis.

7. A photographic lens shutter as claimed in claim 2, wherein the braking mechanism comprises a rockable lever pivotally mounted on the housing, anchoring mechanism mounted on the rockable lever, an anchor wheel in engagement with the anchoring mechanism, and a further wheel geared with said anchor wheel and with said braking lever, and a cam is provided on the control element, which cam is capable of engaging the rockable lever on movement of the control element, towards its position of rest, so that the said lever is rocked whereby the anchoring mechanism is brought out of engagement with the anchor wheel.

References Cited in the file of this patent

UNITED STATES PATENTS

| | | |
|---|---|---|
| 2,129,561 | Brueck | Sept. 6, 1938 |
| 2,176,621 | Brueck | Oct. 17, 1939 |
| 2,410,649 | Fuerst | Nov. 5, 1946 |

FOREIGN PATENTS

| | | |
|---|---|---|
| 1,086,122 | France | Aug. 4, 1954 |